(No Model.) 2 Sheets—Sheet 1.

W. F. BOSSERT.
UNDERGROUND JUNCTION BOX FOR ELECTRIC CONDUCTORS.

No. 596,229. Patented Dec. 28, 1897.

WITNESSES
Rich. A. George.
Dwight H. Colegrove

INVENTOR
WILLIAM. F. BOSSERT
BY Kirley, Robinson & Love
ATTORNEY'S.

(No Model.) 2 Sheets—Sheet 2.
W. F. BOSSERT.
UNDERGROUND JUNCTION BOX FOR ELECTRIC CONDUCTORS.
No. 596,229. Patented Dec. 28, 1897.
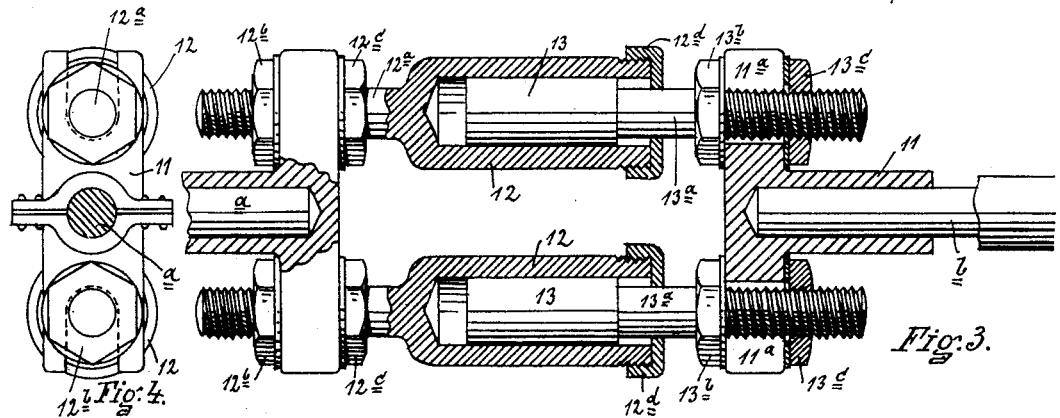
Fig. 3.
Fig. 4.
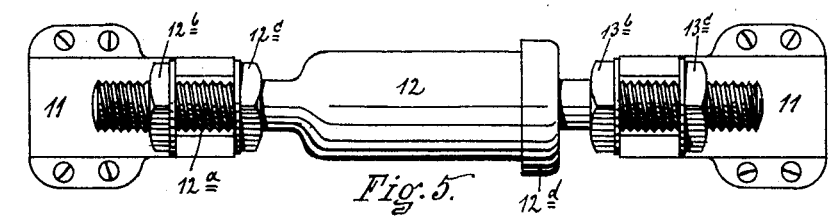
Fig. 5.
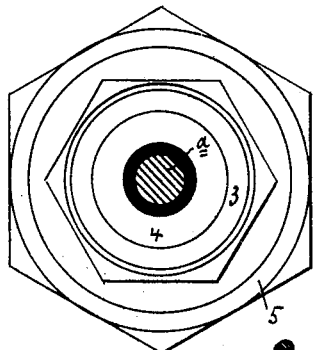
Fig. 7.
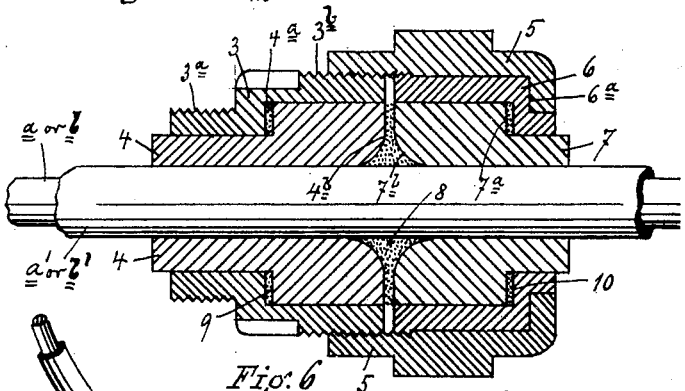
Fig. 6.
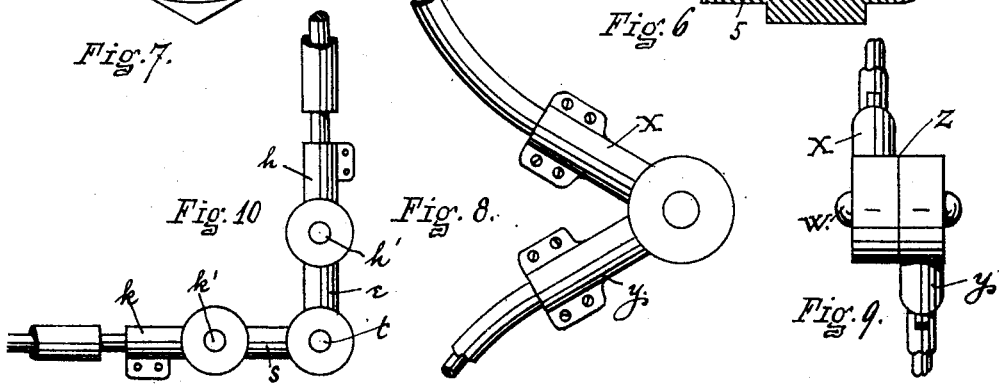
Fig. 10. Fig. 8. Fig. 9.
WITNESSES.
Rich. A. George.
Dwight H. Colegrove.
INVENTOR
WILLIAM F. BOSSERT
By Risley, Robinson & Love
ATTORNEY'S.

United States Patent Office.

WILLIAM F. BOSSERT, OF UTICA, NEW YORK, ASSIGNOR TO THE BOSSERT ELECTRIC CONSTRUCTION COMPANY, OF SAME PLACE.

UNDERGROUND JUNCTION-BOX FOR ELECTRIC CONDUCTORS.

SPECIFICATION forming part of Letters Patent No. 596,229, dated December 28, 1897.

Application filed February 17, 1897. Serial No. 623,914. (No model.)

*To all whom it may concern:*

Be it known that I, WILLIAM F. BOSSERT, of Utica, in the county of Oneida and State of New York, have invented certain new and useful Improvements in Underground Junction-Boxes for Electric Conductors; and I hereby declare that the following is a full, clear, and exact description of the invention, which will enable others skilled in the art to which it appertains to make and use the same, reference being had to the accompanying drawings, and to the letters and figures of reference marked thereon, which form part of this specification.

Figure 1:
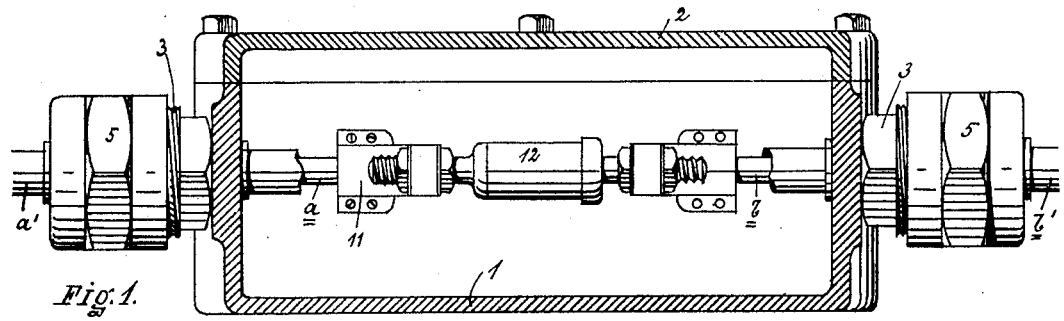
Figure 2:
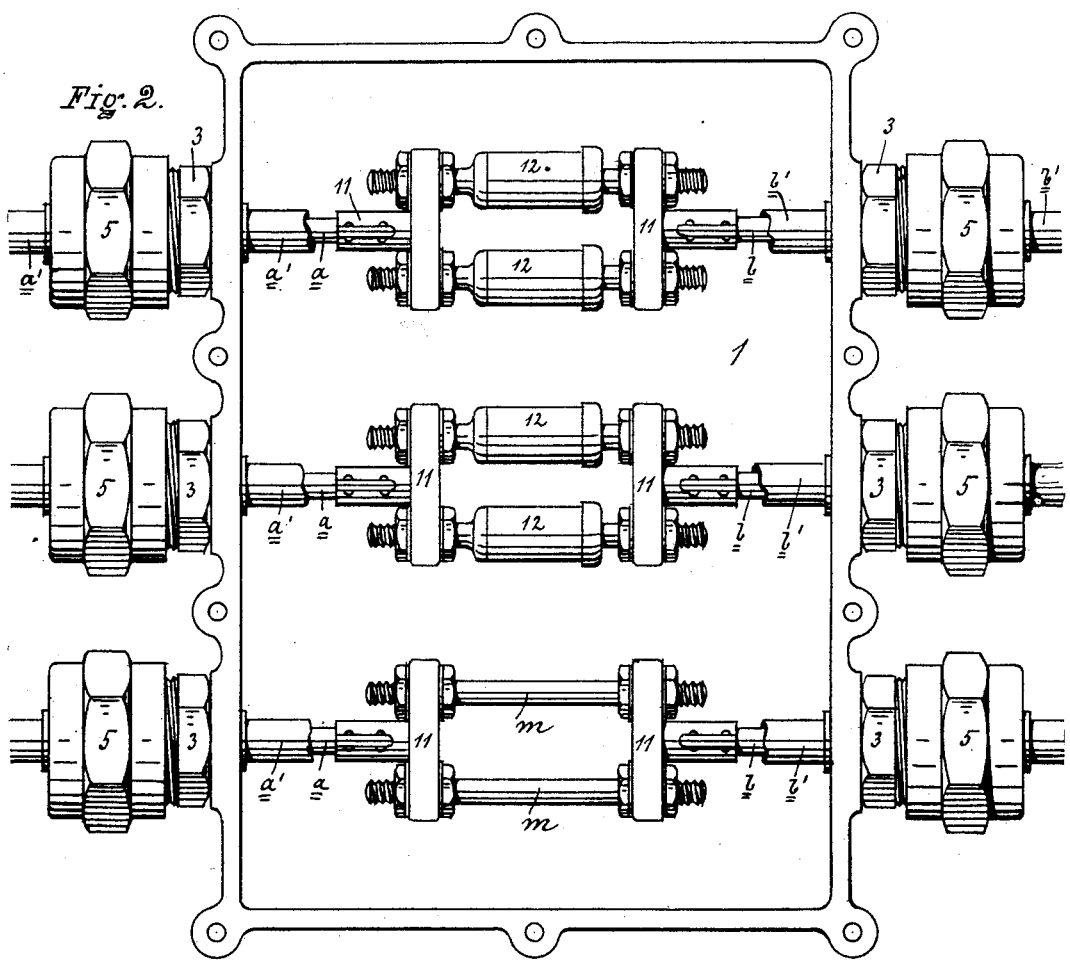

In the drawings, Figure 1 shows a cross-section of the underground junction-box with its cover. Fig. 2 shows a plan view of same with cover removed. Fig. 3 shows details of the extensible connection between the electric conductors partially in section. Fig. 4 shows an end view of the device shown in Fig. 3. Fig. 5 shows a side elevation of the same. Fig. 6 shows in section insulating stuffing-box employed in the construction. Fig. 7 shows an end view of the stuffing-box shown in Fig. 6. Fig. 8 shows details of the modified form of construction. Fig. 9 shows an edge view of the device shown in Fig. 8. Fig. 10 shows another modified form of construction.

Referring to the reference letters and figures in a more particular description of the device, 1 indicates the body of my junction-box.

2 is the cover, secured thereto by screws or in any other suitable manner.

The box, as illustrated, is extended to accommodate three conductor-cables. These cables are indicated by $a$ $b$ and are inclosed in an insulating-cover $a'$ $b'$, respectively. To provide for the entrance of the cables into the box and at the same time insulate them from the box, I provide a stuffing-box constructed as follows:

3 indicates the fixed portion of the stuffing box, provided with a screw-thread $3^a$, adapted to be screwed into a screw-threaded opening in the side of the box, as shown. The fixed portion 3 is of the form shown and is adapted to receive the porcelain bushing 4, having shoulder $4^a$ and rounding end $4^b$. The fixed portion 3 of the stuffing-box is provided also with a screw-thread $3^b$, adapted to receive the screw-thread portion of the cap 5. The cup 5 is chambered to receive the supplementary collar 6, this collar having an offset forming a shoulder $6^a$, against which the inwardly-turned edge of the cap 5 is adapted to act. The collar 6 is adapted to receive the porcelain insulating-bushing 7, provided with shoulder $7^a$ and rounded end $7^b$. The openings in the porcelain bushings 4 and 7 are of very slightly larger diameter than that of the cable $a$ or $b$ with its covering $a'$ or $b'$, as the case may be. Between the rounded ends $4^b$ and $7^b$ of the bushings 4 and 7 is provided a packing 8, of jute or fibrous material. The cable is inserted through the stuffing-box, while the cap 5 is screwed off and the packing 8 is then placed in position. After the cable is in position the cap 5 is screwed up, forcing the porcelain bushing 7 toward the bushing 4 and compressing and concentrating the packing 8, so that it will closely pack around the cable and make the joint water-tight. Between the shoulder on the bushing 4 and its corresponding internal shoulder on the fixed stuffing-box piece 3 is provided an elastic washer 9. Between the porcelain bushing 7 and the collar 6 is also provided an elastic washer 10. Within the box the cables entering from opposite sides are connected by the following extensible mechanism: On the ends of the cables is secured, by clamping or soldering, or both, a T-headed fastener 11. These T-headed fasteners are provided in the ends of the head with slots $11^a$ $11^a$, adapted to receive the screws of the extensible mechanism hereinafter described. Between the T-headed fasteners 11 11 on the cables entering from opposite sides are provided the cylinder or barrel 12 and the sliding plug or piston 13, fitting and sliding tightly in the barrel or cylinder 12. The cylinder is provided with a screw-threaded projection $12^a$ on one end, adapted to be secured to the head 11 by lock-nuts $12^b$ and $12^c$, engaging upon opposite sides of the arms of the fastener 11. There is also provided on the end of the cylinder a screw-cap $12^d$. The plunger or piston 13 is provided with a stem $13^a$, which passes out through an opening in the cap $12^d$, and is provided with lock-nuts $13^b$ $13^c$ on its screw-threaded end, these nuts being adapted to engage on opposite sides of the slotted arms of the T-fasteners 11. By means of the nuts $12^b$ and $12^c$ on the one side and $13^b$ and $13^c$ on the other the relative position of the cylinder 12 and the piston 13 is adjusted, so that under normal conditions the piston will be in the center of the cylinder. An expansion or contraction of the cables is provided for by relatively moving the cylinder 12 and the piston 13, while the contact and conductivity are not impaired. In the expansion and contraction of the cable-conductors, the same will slide through the stuffing-boxes heretofore described, which do not clamp the cables so hard as to prevent their sliding, while still making the joint water-tight. By providing the cylinders and pistons 13 in pairs between the jointed ends of the cables sufficient provision is made for conducting the current without undue resistance and the chance of failure of establishing suitable contact is reduced to the minimum.

In practice the junction-boxes which, as before stated, are intended to be used under ground are filled with tar or pitch or some similar substance after the connections have been established, and by the arrangement of insulated-bushing packing-boxes and the extensible connection herein provided, the expansion and contraction of heavy electric conductor-cables are provided for without injury to their insulation, and several cables can be connected in the same box without interference or crossing of the currents therein.

The connection between the ends of the conductors is shown at the lower side of Fig. 2 of the drawings. The extensible connection is omitted—that is, the cylinder 12 and the plunger 13—and simple rods or bolts $m\,m$ are substituted therefor, which will afford a temporary connection or a connection between short sections of cable where expansion and contraction are not necessarily provided for or where the expansion can be provided for from time to time operating the nuts on the bolts $m\,m$.

In Figs. 8 and 9 is illustrated a modified form of construction in which the extension devices heretofore described are omitted and there is substituted therefor binders or fasteners $x\,y$, in which the ends of the cables entering from opposite sides of the box are secured by clamping or soldering, as may be desired, and the parts $x\,y$ pivoted together at $w$ and provided with extensive contact-faces, as shown at $z$. The cables entering the box, when this modified form of construction is employed, are curved and brought toward each other, so that the parts $x$ and $y$ will stand in the relative position shown in Fig. 8. Then an expansion or contraction of the cables is provided for by the opening or closing of the parts $x$ and $y$ with reference to each other, in connection, perhaps, with some bending or springing of the portions of the cables within the box.

The modified form of construction shown in Fig. 10 is intended to provide a connection between conductors entering the box at right angles. The construction consists of heads or fasteners $h\,k$, secured to the ends of the conductors. The parts $h$ and $k$ are pivoted at $h'$ and $k'$, respectively, to the hinge parts $r$ and $s$, which parts are pivoted together at $t$. By this construction the electrical connection is established while providing for expansion and contraction of the conductors and without springing or binding of the conductors.

What I claim as new, and desire to secure by Letters Patent, is—

1. The insulating stuffing-box consisting of a body portion, an insulator-bushing held therein, a cap, an insulator-bushing held therein and an elastic packing between the adjacent ends of the bushings, substantially as set forth.

2. The combination of a stuffing-box body, a screw-cap therefor, an insulator-bushing held in the box-body, an insulator-bushing held by the cap and having a shoulder against which the cap acts and elastic packing between the adjacent ends of the bushings, substantially as set forth.

3. The combination of a junction-box, stuffing-boxes constructed and arranged to allow the conductors to move lengthwise therein and affording water-tight insulated entrances for the conductors, and internal extendible and contractible connecting devices for the conductors, substantially as set forth.

4. An extendible electric-conductor coupling consisting of a plunger adapted to be attached to one end of the conductor and a cylinder adapted to be attached to the other conductor end and adapted to receive the plunger and having means to prevent the plunger being withdrawn from the cylinder, substantially as set forth.

5. An electric-conductor coupling consisting of a plunger 13 and a cylinder 12 and cap combined, substantially as set forth.

In witness whereof I have affixed my signature in presence of two witnesses.

WILLIAM F. BOSSERT.

Witnesses:
WM. D. POMEROY,
E. W. JONES.